United States Patent [19]

Baysek

[11] 4,022,594
[45] May 10, 1977

[54] ELECTROSTATIC PRECIPITATOR

[76] Inventor: Edward L. Baysek, 141 Biscayne Terrace Extension, Pittsburgh, Pa. 15212

[22] Filed: May 2, 1975

[21] Appl. No.: 573,846

[52] U.S. Cl. .................. 55/139; 55/146; 55/147; 55/150; 55/154
[51] Int. Cl.² ........................... B03C 3/02
[58] Field of Search ........... 55/2, 139, 141, 143, 55/146–150, 154, 157

[56] References Cited
UNITED STATES PATENTS

| | | | |
|---|---|---|---|
| 1,119,469 | 12/1914 | Nesbit et al. | 55/154 X |
| 2,359,149 | 9/1944 | Pegg | 55/143 X |
| 2,585,138 | 2/1952 | Langraf | 55/147 X |
| 2,588,111 | 3/1952 | Hanneman | 55/147 X |
| 2,900,042 | 8/1959 | Coolidger et al. | 55/147 X |
| 2,922,883 | 1/1960 | Giaimo, Jr. | 55/147 X |
| 3,006,066 | 10/1961 | Grossen et al. | 55/146 X |
| 3,175,341 | 3/1965 | Winter | 55/143 |
| 3,191,362 | 6/1965 | Bourgeois | 55/139 X |
| 3,282,029 | 11/1966 | Steveragel | 55/141 |
| 3,482,375 | 12/1969 | Ellingen | 55/154 X |

Primary Examiner—Frank W. Lutter
Assistant Examiner—David L. Lacey
Attorney, Agent, or Firm—Parmelee, Miller, Welsh & Kratz

[57] ABSTRACT

An electrically operated cleaner to remove dust, pollen, smoke, etc. from the air in the nature of an electrostatic precipitating apparatus is shown. It is suitable for general utilization including furnace or air conditioner mounting. An operating unit is adapted to be removably carried within a frame-like housing which is open from its opposite wide sides for fluid or air movement therethrough, and which is electrically energized through the agency of a power pack to supply energy of one potential to a row of spaced-apart cell-defining plate members and to supply energy of opposite potential to in-between-spaced ionizing wires of one or more wire rows. A plate row of continuous construction is, in one embodiment, contoured for more efficient air through-flow cleaning action in one direction than the other, and in other embodiments is contoured for substantially equal efficiency of through-flow cleaning action from either open side of the apparatus. Continuous length stretches of ionizing wires are mounted in an extending, spaced-apart and continuous relation along a pair of insulated, oppositely positioned bars. The wire stretches are carried in a tensioned relation by flexible stretching or spring means. Flexible, slidable electrical connectors enable the operating unit to be readily inserted and removed from the housing.

27 Claims, 20 Drawing Figures

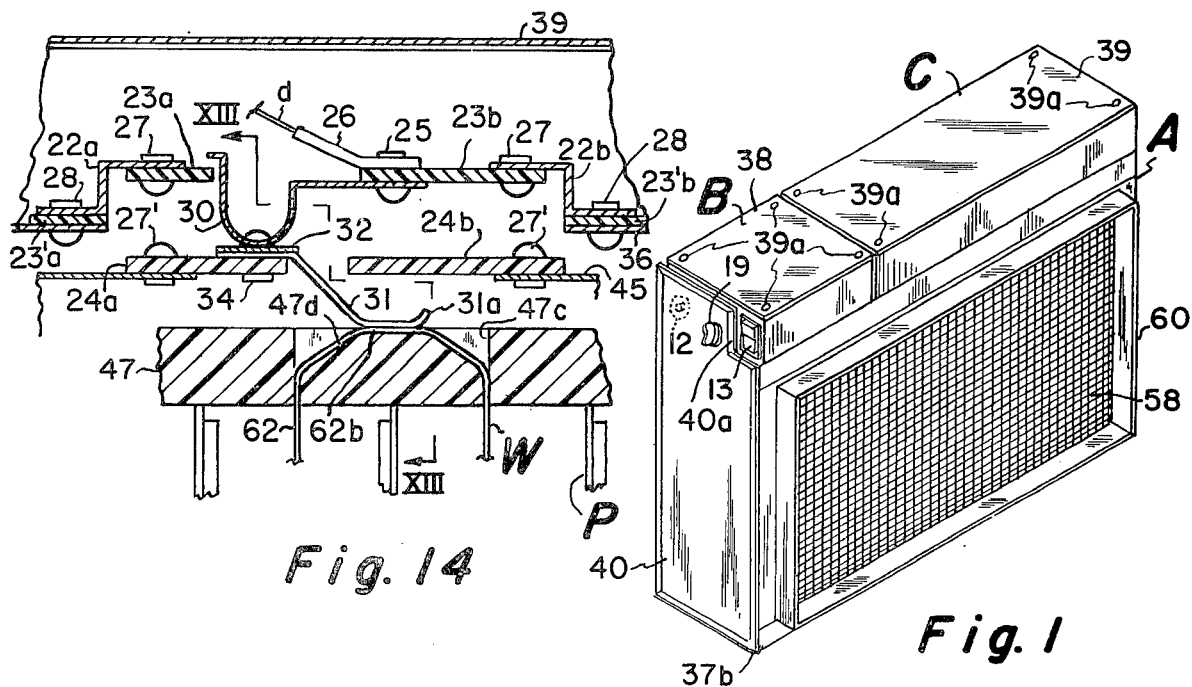
Fig. 14
Fig. 1
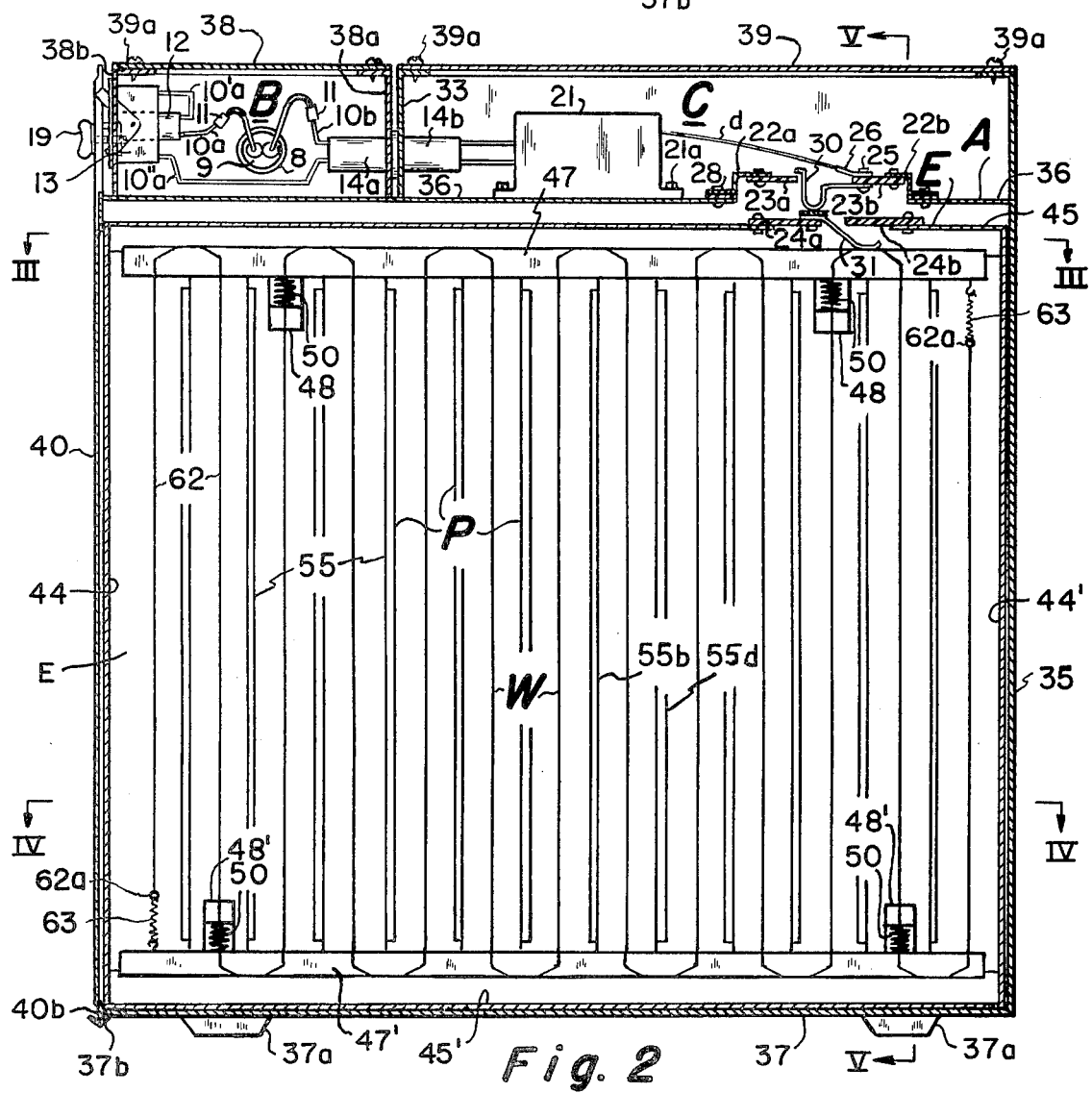
Fig. 2

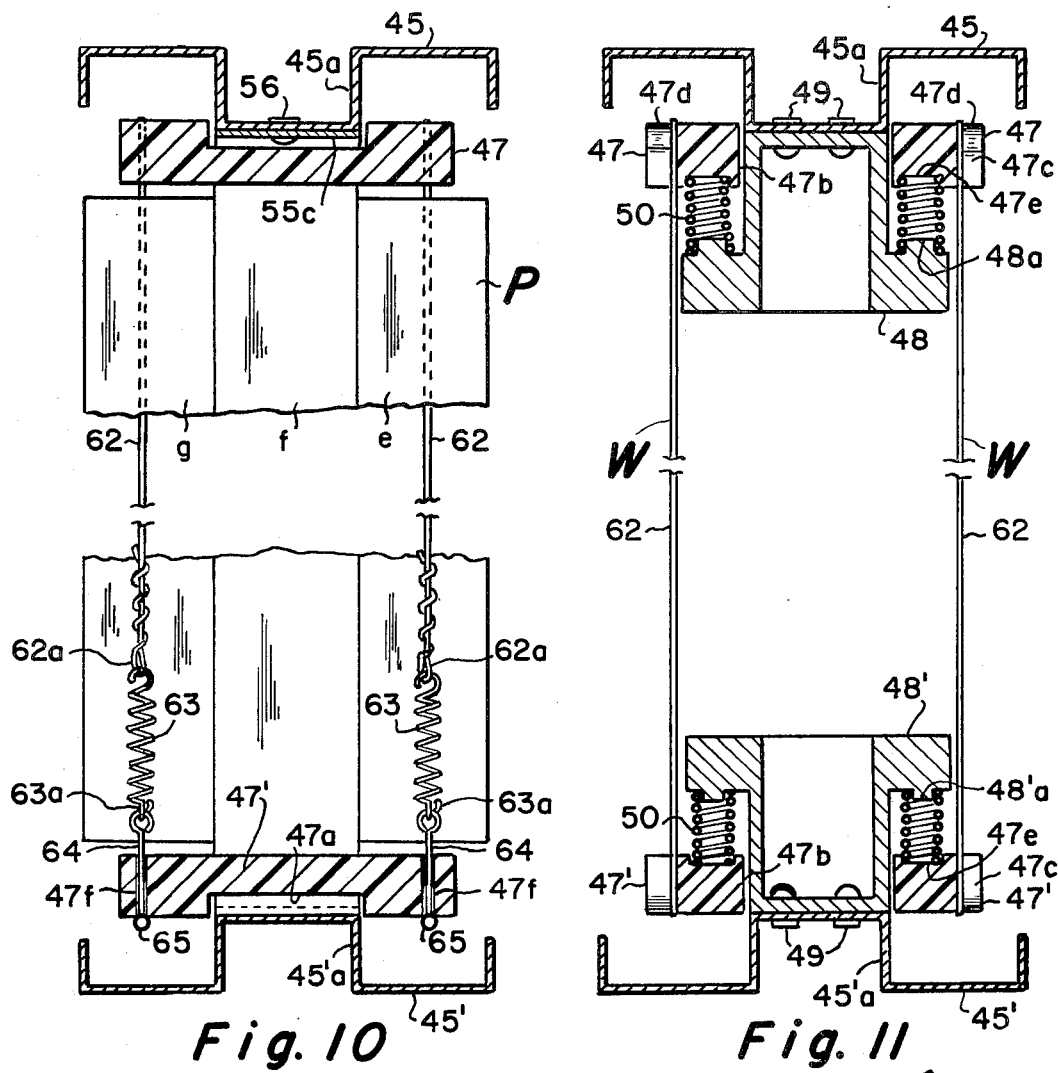
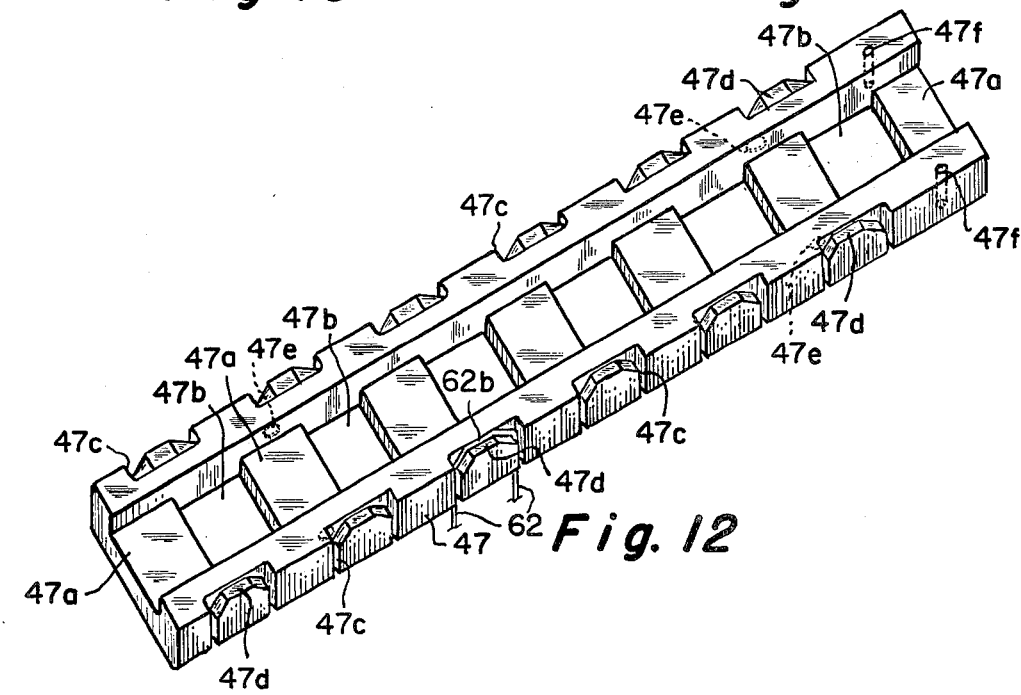

4,022,594

ELECTROSTATIC PRECIPITATOR

BACKGROUND OF THE INVENTION

1. Field of the Invention

This invention pertains to a so-called electrostatic type of precipitating apparatus or unit which may be portable and which is improved as to structure and operation. A phase of the invention deals with a precipitator which makes possible the use of electrically energized elements of continuous construction and particularly, which will provide for a tensioned mounted retention of an ionizing wire assembly thereof.

2. Description of the Prior Art

Heretofore, there have been many types of electrostatic filters or precipitators which have been based upon the Cottrell (U.S. Pat. No. 895,729) idea of ionizing dust-laden air with electricity of one potential while energizing a so-called collecting surface with electricity of opposite potential, such that dust particles charged by an ionizing portion of the apparatus will tend to move towards and deposit themselves on the collecting surface. Independent ionizing and collector sections, as established by the Penney U.S. Pat. No. 2,129,783 of 1938, have been employed in equipment manufactured to date for residential, commercial and industrial applications. Dielectric filtering units, typical of R. W. Newell of 1966, were found to be less efficient and impractical.

Due to the need for a plurality of individual ionizing wire stretch lengths or pieces along flow channels or passageways for more efficient precipitation or pick-up, the constructions have tended to become more and more complex and expensive. The need has been for a simplified but sophisticated type of apparatus which will provide a device of minimized size at a minimized cost while at the same time maximizing efficiency. The present day trend has been towards minimizing the cost with a resultant lowering of efficiency.

There has been thus an urgent need for a more efficient type of apparatus which will be simplified in its construction and, at the same time, which will have a good operating efficiency. Briefly, the trend from the early development of apparatus of a relatively simple construction has been towards more costly and complex units where maximized efficiency is to be attained and towards units of poorer efficiency where smaller size and lower cost are factors to be considered. There has been the need for a less costly unit of good or better efficiency than heretofore attained.

In endeavoring to solve the problem involved, it has been determined that the key to meeting it rests principally upon the construction and mounting of the dust energizing or ionizing elements, as well as the collector elements and particularly, on the need for devising an apparatus that will essentially make possible the utilization of a combined ionizing and collector section, of a continuous wire length for an ionizing row assembly and that will also permit the use of a continuous metal length in the construction of a collector plate assembly. I have been able to accomplish this in my improved device.

SUMMARY OF THE INVENTION

It has thus been an object of the invention to analyze the factors involved in accomplishing a more efficient operative type of gaseous medium purificating or precipitating unit.

Another object has been to meet such factors and provide a relatively inexpensive, efficient and improved electrostatic precipitator.

Another object has been to devise a unit that will make possible the employment of continuous electrical elements as well as a simplified and more efficient mounting of the elements and with respect to each other.

A still further object of the invention has been to develop precipitating apparatus that will be of substantially equal efficiency when mounted in position to receive and bypass a through-flow of dust-laden air or gas, without regard to the side of application of the through-flow.

A still further object of the invention has been to meet the need for an efficient and low cost precipitator of simplified construction which will increase the field of application of clean air or environmental control devices of this type.

These and other objects of the invention will appear to those skilled in the art from the illustrated embodiments and the claims.

BRIEF DESCRIPTION OF THE DRAWINGS

In the drawings,

FIG. 1 is a perspective view in elevation illustrating an apparatus constructed in accordance with the invention;

FIG. 2 is an enlarged side section in elevation of the unit or apparatus of FIG. 1, particularly illustrating the construction and mounting of operating elements utilized;

FIG. 10 is a greatly enlarged broken-away end section in elevation of the unit of FIG. 2, particularly illustrating the construction and utilization of opposed or upper and lower, insulated, cross-extending, horizontal, wire-mounting bar members and also the tension mounting of opposite ends of an ionizing wire length with respect to opposed mounting bar members;

FIG. 11 is a vertical end view in elevation on the scale of FIG. 10, and taken adjacent spring means used for flexibly urging opposed ionizing wire mounting bars away from each other;

FIG. 12 is a top perspective on a reduced scale particularizing the construction of a member of a pair of opposed insulated bar members that may be employed to carry at least one ionizing wire row in a suspended relation between the pair;

FIG. 14 is a vertical sectional detail on the scale of FIG. 13, illustrating flexible connector elements for and a method of electrically connecting or energizing an operating unit of the apparatus in such a manner as to permit the operating unit or electrical element assembly to be slid into and out of position within an outer housing frame;

DESCRIPTION OF THE PREFERRED EMBODIMENTS

Figure 3:
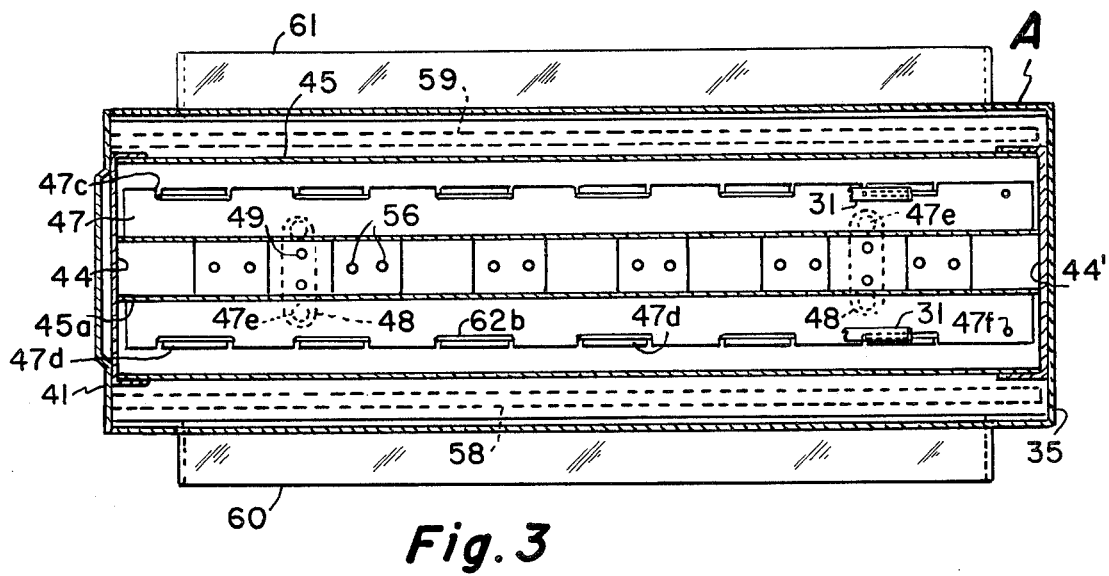
FIG. 3 is an upper horizontal section on the scale of and taken along the line III—III of FIG. 2.

In the embodiment of FIGS. 1 and 2 set forth to illustrate principles of the present invention, an outer or main, frame-like housing unit A has a central chamber or compartment therein defining a depthwise front to back, through-extending, open central or window portion which houses an electric operating unit E. The unit E is energized by electric parts or elements disposed in an upper, high voltage compartment C which is supplied with low voltage electric energy from an adjacent, junction box compartment B. The main housing A is shown provided with an upright, plate-like, back end wall member 35, an upper, cross-extending, horizontal, top plate wall member 36, and a bottom plate wall member 37. The rectangular frame provided by the housing A is normally closed-off at its front end wall by a removable, hinged door 40. The bottom plate member 37 is shown in FIG. 2 provided with suitable projecting, lug-like, positioning feet 37a, and at its forward end with a channel-shaped terminating edge that forms a hinge part 37b. The hinge part 37b is adapted to cooperatively receive an offset, bottom edge hinge part 40b of the door 40. The door 40 may, as shown in FIGS. 1 and 2, be normally locked or latched in a closed position by means of a rotative thumbscrew latch 19.

Referring particularly to FIGS. 1, 2, 14 and 15, a source of electric current, such as a 110 volt two wire lead or cable 9, is shown extending through an annular, protective resin bezel 8 that is mounted to extend through a side wall of the compartment B. Two leads 10a and 10b of the source 9 are separated within the compartment B, with the lead 10a being shown connected through a conventional cone-shaped wire end connector 11 to a pushbutton safety switch 12. Lead 10'a from the switch 12 is connected to one side of a manual rocker switch 13, and lead 10''a from the other side of the rocker switch 13 is connected to a male prong of a male connector plug part 14a which projects through an inner end wall 38a of the compartment B. The switch 12 may be a conventional pushbutton switch which is normally spring-urged to an outer, open position such that it will de-energize one line from the source 9 when, for example, the door 40 is either swung outwardly on its hinged portion or thereafter lifted out of position. when the door 40 is moved into its closed position of FIGS. 1 and 2, its inward pushing abutment with the end of the pin of the switch 12 will cause the switch to close the circuit.

For "on" and "off" manual operation the rocker switch 13 which is in the same circuit 10a as the switch 12, may be moved by pivot action from a closed position in which upper face portion is pushed inwardly, to an open position at which its lower face portion is pushed inwardly. The other lead 10b of the power source cable 9 is shown connected through an end connector 11 to a second prong of the male plug part 14a. Low voltage alternating current is supplied through the male plug part 14a to a female or socket plug part 14b that is open through a back end wall 33 of high voltage compartment C.

Figure 15:
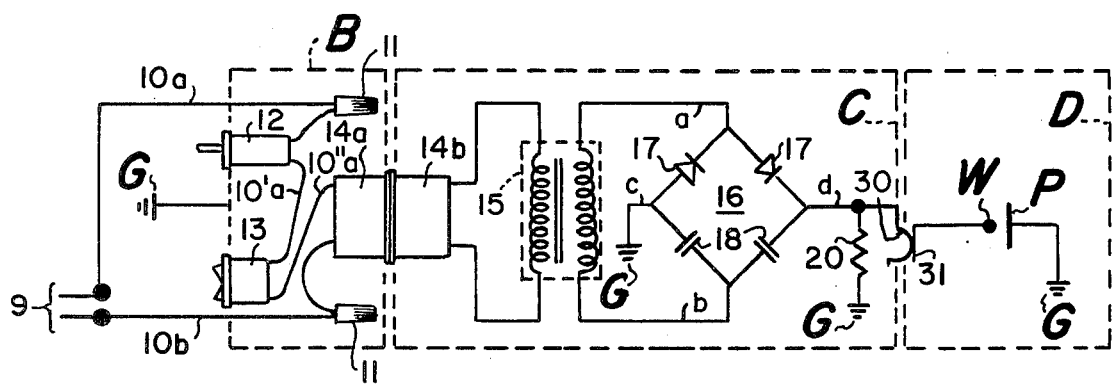
FIG. 15 is a schematic electrical diagram showing a representative operating circuit for electrically energizing a unit of the invention and, at the same time, for enabling segregation of a high voltage portion thereof.

The thus-introduced low voltage electrical current is then applied to a voltage step-up transformer 15 whose secondary supplies stepped-up voltage to a Wheatstone or bridge type rectifier circuit 15 through high voltage leads $a$ and $b$ (see FIG. 15). The positive end is connected to a lead $d$ which energizes one or more ionizing wire rows W through connectors 30 and 31. As shown in FIG. 15, two branches of the circuit 16 are provided with rectifiers 17, such as of a selenium type, and the other two branches thereof are provided with condensers which may be of about 0.015 mfd. The other or negative direct current side $c$ of the rectifier circuit 16 is connected through the ground G to a collector plate line, assembly or row P. A bleed resistor 20 of about 200 megohms is shown connected across the plus and minus lines of high voltage direct current output circuit $c, d$.

With particular reference to FIG. 2, the transformer 15, the circuit 16 and the resistor 20 are carried within an enclosing housing 21 that may be secured on the top wall plate member 36 of the main housing A by suitable means, such as bolts 21a. In this FIGURE, electric lead d which represent the positive direct current output lead is, as also shown in FIG. 14, secured by a connector lug 26 and a connector rivet 25 to one end of an upper or first, spring-like connector 30 of a suitable spring-like conductive material, such as a piece of spring-like strap brass. The connector 30 is carried in an insulated relationship with respect to the negative circuit or grounded top plate 36 by an insulting or resin pad 23b that is shown secured to an upwardly offset, angle-shaped, mounting bracket 22b by a rivet 27. To further the insulated relationship, a resin washer 23'b may be inserted between the top plate member 36 and a lower flange of the mounting bracket 22b and secured by a bracket mounting rivet 28.

A second mounting bracket of angle-shape 22a is secured to an opposite edge portion of an opening through the top plate member 36 by resin pad 23'a and a rivet 28. A resin or insulating stop limit pad 23a is secured by a rivet 27 to project forwardly from a top flange of the mounting bracket 22a. The projecting portion of the pad 23a serves as a limit stop for maximum tensioned inward movement of the connector 30 when, for example, the unit D has been removed from the housing unit A. It will be noted that the forward edge of the connector 30 has a bent-over edge to limit its innermost movement by engagement with the pad 23a.

An inwardly or downwardly projecting, rounded, loop portion of the first connector part or element 30 is adapted to electrically connect with and energize a second, lower or innermost spring-like connector element 31 also of a suitable spring-like metal strap material. A metal wear pad 32 is carried on an upper flange of the connector 31 and is secured to a resin or insulating pad 24a along with the upper flange portion of the connector 31 by a rivet 34. The insulating pad 24a is secured on an edge portion of the top plate member 45 of the operating unit D by a rivet 27' to project forwardly of an opening in the member 45. An opposed insulating or resin pad 24b is secured on an opposed opening-defining edge portion of the plate 45 by a rivet 27' to project into the opening and limit the maximum outer or upper movement of spring-like, inwardly tensioned, connector element 31. The element 31 has a lower, dish-shaped, slide-contacting foot portion 31a that is adapted to slide along the outer surface of a side rail of an insulated or resin, horizontal or cross-extending wire assembly mounting bar member 47 for movement into and out of an electrical conducting connection with a loop portion 62b of a pair of stretches or spaced-apart adjacent lengths 62 of an ionizing wire row W to thus supply positive potential energizing electric current thereto.

Figure 6:
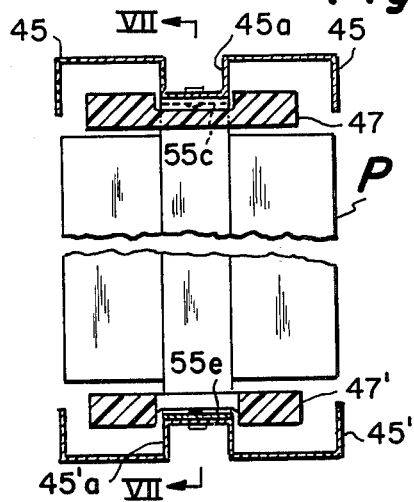
FIG. 6 is a broken-away detail in elevation taken endwise of the apparatus of FIG. 2, is of a slightly enlarged scale, and particularly shows the construction and positioning of opposite or upper and lower insulating bars for mounting a row of ionizing wire stretches in a continuous looped arrangement with respect to each other therealong; this view also shows the relative positioning of a collecting plate portion of the apparatus.
Figure 7:
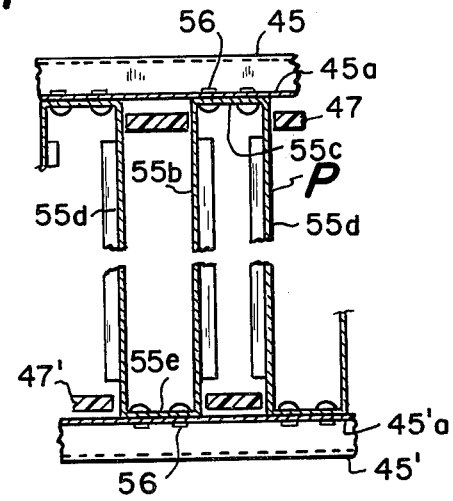
FIG. 7 is a broken-away side detail in elevation on the same scale as and taken along line VII—VII of FIG. 6, particularly illustrating the construction and mounting of a collecting plate assembly of the operating unit of the apparatus, and showing opposed or upper and lower, horizontal, metal support members which, as shown in FIG. 6 are of U-shaped or centrally offset construction.

The operating unit E is supported in the rectangle frame of unit A and, as shown, has opposed, upright or cross-extending end plate members 44 and 44' extending and upper and lower, cross-extending or top and bottom metal support, framing or closure members 45 and 45'. The unit E, see particularly in FIG. 1 to 4, is adapted to be slid endwise within the confines of the outer housing unit A from the end which has the swinging door 40. As shown in FIGS. 6 and 7, inclusive, the upper and lower members 45 and 45' are of the same construction, having a channel or U-shape, with an inwardly offset, recessed wall, reverse U or channel-shaped central portion 45a, 45'a xtending therealong. A depressed central flange of the central recessed portion 45a, 45'a provides a mounting support for a continuous plate member assembly row or line P, as well as for end-positioned, T or channel-shaped support brackets 48 (see FIG. 5).

It will be noted that rivets 56 extend through opposite cross-connecting, integral end tabs spacer portions, flanges or feet 55a, 55c and 55e (see FIGS. 7, 8 and 9) of the plate assembly P to secure the plate assembly row or line P to the offset, central portions 45a, 45'a of opposed or upper and lower metal support and closure members 45, 45' of the operating unit E. The plate assembly P may be of any suitable desired side wall configuration, as illustrated by FIGS. 4, 9 and 16 to 20, inclusive. It is shown of one-piece metal, continuous, spaced-apart, loop-like construction of somewhat zig zag shape to define spaced-apart, through-extending chamber, section or zone areas. It may be made by using, for example, a so-called radial arm bender. This assures simplicity in the construction of a unitized, ionizing-collecting section, cell or zone, an improved electrical efficiency and simplification of mounting.

Within the confines of each member of the opposed pair of metal support members 45 and 45' is provided a longitudinally extending member of a pair of opposed, insulated or resin stretch, spreader bar or wire row mounting members 47 and 47'. The members 47, 47' serve as insulated mounting members for one or more ionizing wire rows W. To maximize tension as applied to wire stretches or lengths 62 of each wire row W, each bar 47, 47' is, at its opposite ends, provided with an outwardly spring-pressed mounting which utilizes a pair of compression springs 50 and associated cross-extending mounting brackets 48, 48'. As shown particularly in FIGS. 5 and 11, the insulated, stretch, wire mounting bars 47 and 47' have circular recesses 47e to receive an outer end of an associated compression spring 50. Side ledges of each cross-extending end bracket 48, 48' have projecting, pin-like, mounting lugs 48a, 48'a (FIG. 11) for receiving the innermost end of an associated spring 50. Since each bracket 48, 48' is secured to an associated stationary support member 45 or 45', it serves as a stationary support for the innermost ends of the compression springs 50 to thus apply a constant outward spreading force on the opposite ends of each resin bar 47, 47' (see FIG. 1).

In the illustrated embodiments represented by FIGS. 1 to 19, inclusive, a pair of tandem, ionizing wire rows or lengths W are provided and carried by a pair of side rail portions of each resin bar 47, 47'. The use is avoided of conventional prior art separate, ionizing wire length pieces or stretches that are individually secured at their ends between a pair of conductor bars that are rigidly mounted in an insulated relation within a unit. That is, a continuous wire length is provided for each row W along one side rail of the pair of opposed bars 47, 47'. Each end of each continuous wire length has its last stretch or length portion 62 provided with a closed, twisted or turn-formed connecting loop 620 within which an inner hook end of a tension spring 63 is latched. The outer hook end of the spring 63 is connected to an eyelet pin 64 whose head portion 65 is mounted within a through-extending hole 47f in a side rail portion of an associated bar 47, 47' (see FIG. 10).

In this way, each end of the full integral length of the row W defined by eadh continuous wire piece may, for example, be at one end resiliently secured under tension to a lower bar 47' and at its other end to the opposite end of an upper bar 47 in a tightly tensioned relation along its full extent, as further enhanced by an outward spreading spring force exerted on the opposite end of opposed bars 47 and 47' by the pairs of compression springs 50. As shown particularly in FIGS. 2, 3, 4, 10, 12 and 14 of the drawings, upper and lower spacer loop portions 62b of adjacent stretches 62 of each wire row W are adapted to extend along rounded excess portions 47d in side rails of associated bars 47, 47' from open-side slots 47c along the associated side rails. This enables the wire stretches 62 to be easily mounted in a flexibly retained, tensioned relation along the bars, and permits the continuous wire length of each row W to adjust under tension and retain itself in a tight, tensioned relation between the bars 47 and 47'. The springs and their cooperating means maybe termed force generating means for maintaining the wire lengths in a self adjusting tensioned relation along the open portions between the plates. This type of arrangement not only eliminates the many points of ozone formation as represented by turned-over ends of individual wire lengths of a conventional device, but provides a much more efficient electrical row assembly, and one which is easily assembled and disassembled and is greatly simplified in its insulated mounting and construction.

In devising an improved precipitation apparatus or unit for cleaning air or gas of refuse, such as dust, pollen, smoke, etc., a greater depth or extent of ionizing and collecting passageways or zones is enabled. Also, the ionizing and collecting operations are, in effect, combined in continuous dual-operating, cross area or zones through the device. Operating zones or areas defined by the longitudinally and widthwise extending spaced-apart adjacent wall portions of a plate assembly P, utilizing tandem, two rows or lines of ionizing wire lengths W therebetween, may provide an ionizing zone depth or width extent of about 4 inches, as compared to an ionizing zone depth of about ¾ of an inch for a single ionizing wire row of larger sales volume units of conventional construction. Also, see FIG. 20, a unit of the invention having a tandem, three ionizing wire array or row assembly may have a depth or width of flow-through zones or compartments of about six inches.

In an optimum construction in accordance with the invention, the flow-through contour of the compartments or zones, as defined by the spaced-apart width extent of plate parts such as 55, 55b and 55d, may be varied to enable a variance in velocity of flow, provide a more efficient and complete pick-up of the gas or air contaminants, and provide a better and more efficient operation from the standpoint of utilizing a non-uniform electrostatic field. Slightly as well as more highly ionized or charged dust particles will be precipitated on different wall surface portions of the plate parts. Utilizing such a system, air flow velocity may be minimized and the spacing between adjacent plate parts may be greater due to more complete ionization. Efficiency and completeness of pick-up is enhanced by use of immediately positioned collector plate portions.

Assuming that the cleaning action is to be effected on air being moved at atmospheric pressure, the power requirement is about 30 to 31 kilovolts/cm. Spark over or corona effect has heretofore been a limiting factor in the voltage applied with, of course, the highest voltage gradient being represented by the region immediate to the ionizing wires and at which refuse collision occurs. Ionizing by collision will occur up to about 10 to 40 mils from the wires. A lower velocity of air movement, higher voltages and a lower current flow may now be employed. The positive ions provided by the wire rows W are taken-up by the refuse particles that are then attracted to and flow towards negative plate parts, with the potential gradient decreasing as the distance from an ion emitting wire length 62 increases.

In accorance with the present invention, the air drift velocity may be maintained relatively low which enables a better pick-up of ions by the dust particles to charge them during their movement through the operating zones or compartments. Although wire sizes up to 32 mils may be used in the construction of the invention, as compared to a normal mxaimum of about 8 mils, it has been found desirable to use a wire size of about 6 to 1.0 mils in diameter or, in other words, the smallest size that mechanical considerations will permit. In this way, a ratio between the size of the wires to the size of the plates may be maintained relatively high, with the lowest being about 100 to 1 but with a ratio of about 2000 to 1 being advantageous.

Ozone generation is lessened by making the ionizing chambers or zones larger by, for example, increasing the spacing between the plate parts, and by eliminating individual end connections for each ionizing wire stretch or cross length. As shown, only one continuous wire is used for each row W, and thus, only two opposite end mounts are needed. It is also advantageous in an optimum utilization to provide a so-called non-uniform or serpentine electrostatic field of through passageway or zone arrangement, such that there will be a progressive pecipitation of both the slightly, as well as the more highly charged dust or refuse particles. Greater space is made possible by placing the wires in the same section as the plates. Greater ionization is assured by the use of full width-extending collector plates to define spacing areas for the tandem ionizing wire stretches.

Using, as contemplated, a tandem arrangement or array of ionizing wire lines or rows W, it has been found to be desirable to provide at least alternate through-flow operating zones in which the wire lengths are within immediate maximized width or spacing areas between opposed plate parts. This enables a maximized ionization without arc-over and, at the same time, provides for the collection of the more strongly ionized particles on immediate, more widely spaced plate areas, with less strongly ionized particles being collected in advanced areas of lesser plate spacing. Such a type of arrangement permits a maximized voltage without cross-over arcing.

A suitable operating voltage may be within about 4000 volts D.C. up to about 10,000 to 15,000 volts D.C. Variation of the contour of the passageways or zones may be used to give a Venturi effect to increase and decrease turbulence of the movement therethrough and effect an overall better ionization and pick-up of the dust particles.

The operating device may be cleaned in any conventional manner and it is preferable in this connection to move it endwise through the opening covered by the door 40 and then wash, brush or blow down the collected debris on the plate parts. Employing a tandem arrangement of ionizing wire rows, a double, triple or multiple ionization is effected which makes possible the use of higher wire voltages and a marked increase of efficiency in small units from an ordinary 30 to 35% to one more closely approaching the 95% of the larger and more expensive units. The collecting plates may be of any suitable metal material, such as aluminum or copper, the ionizing wires are of any conventional conductor metal material, such as tungsten steel having suitable strength characteristics for their size and having reasonably good electrical conductivity. The insulating pads and stretch bars may be of any suitable resin material, such as nylon or a suitable glass fiber reinforced resin. The construction gives flexibility as to spacing between, the shape and width of plate parts, the number of wire rows, etc. Weight of the unit is minimized from the standpoint of capacity, and pressure drop may be significantly lessened in the order of about 50%. Although the elements of the operating unit E are shown extending vertically for the purpose of illustrating the principles of the invention, it will be apparent to those skilled in the art that they may be mounted, if desired, to extend horizontally of the device.

Figure 4:
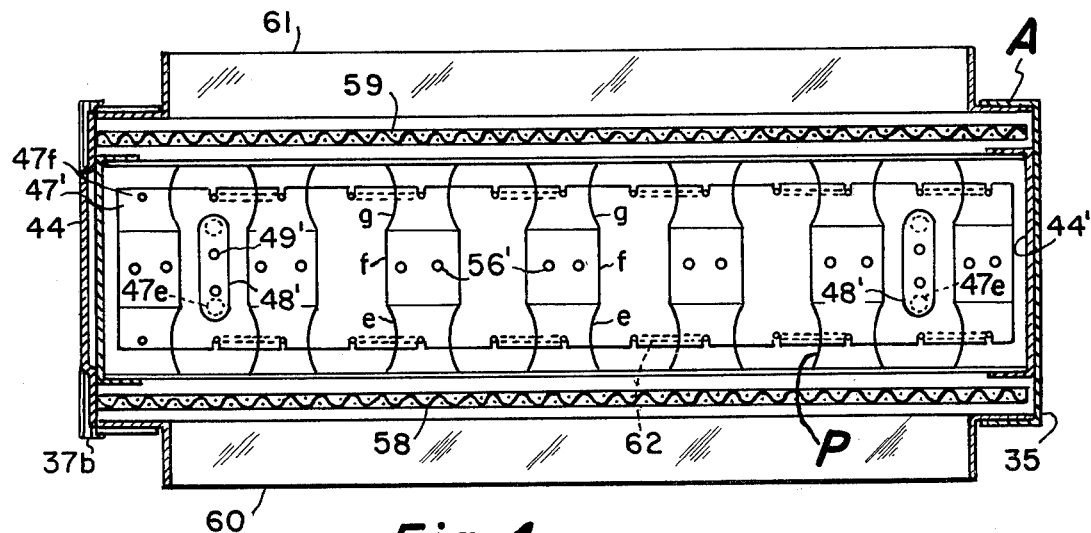
FIG. 4 is a lower horizontal section on the scale of FIG. 3 and taken along the line IV—IV of FIG. 2.
Figure 5:
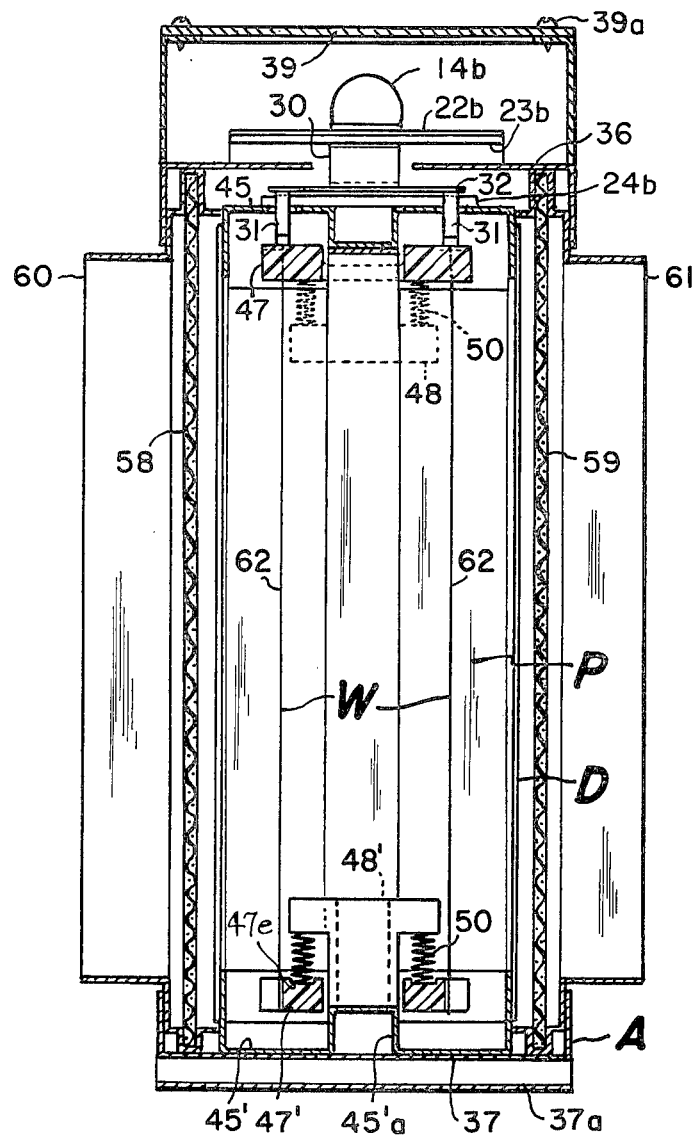
FIG. 5 is an end section in elevation on the scale of FIG. 2 and taken along line V—V thereof.
Figures 8, 9:
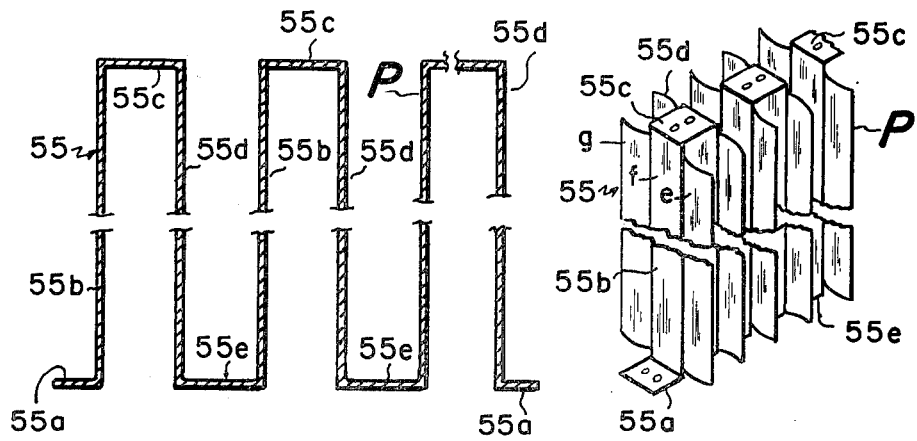
FIG. 8 is a broken-away side section in elevation on the scale of FIGS. 6 and 7, illustrating the construction of a plate member assembly.
FIG. 9 is a broken-away side perspective in elevation on a reduced scale further illustrating construction of the plate member assembly.
Figure 13:
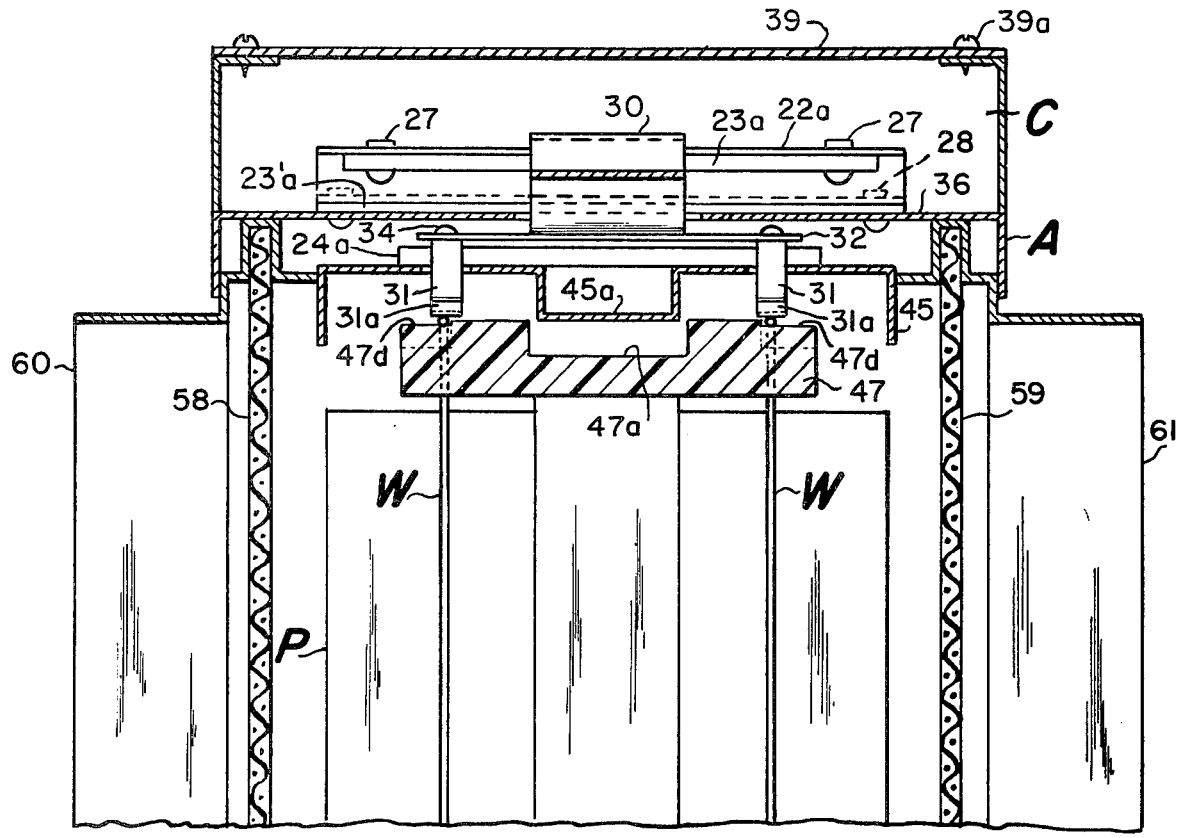
FIG. 13 is an end sectional detail in elevation on a further enlarged scale, illustrating the mounted relation between an insulated bar member and an adjacent metal frame member and particularly, flexible connecting spring means for energizing each ionizing wire length of a pair of ionizing wire rows carried by the bar member.

FIGS. 4 and 9 of the drawings illustrate a preferred plate contour that, at its open ends, has inwardly concave and outwardly convex side portions $e$ and $g$ in which the ionizing wire lengths 62 are substantially centrally positioned. The central area or extent has a contour represented by opposed planar side portions $f$ which thus provide for the collection of less intensely ionized dirt particles as they move from an entrance chamber of outwardly enlarged contour. In such a construction, it will be apparent that the direction of air flow may be from either side of the plate structure P, depending upon convenience of mounting, for example, on a furnace or on an air conditioning unit. If the device is to be used along, then a suitable fan may be installed along one side thereof, as for example, in an enlargement of a side frame 60 and 61.

Figure 16:
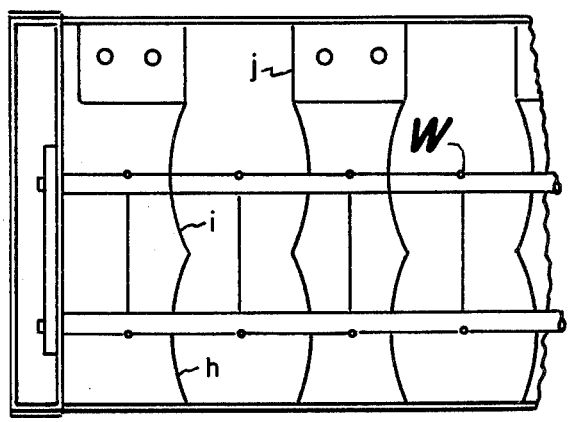
FIGS. 16 and 18 are somewhat diagrammatic horizontal fragmental views on a slightly enlarged scale with respect to FIGS. 3 and 4, illustrating different plate contours in the sense of passageways defined between opposite sides of a unit through which fluid flow is to be accomplished; in these two figures the operation is more efficient if the air flow is in a direction from the side which represents the bottom of these figures towards the top thereof.
Figure 18:
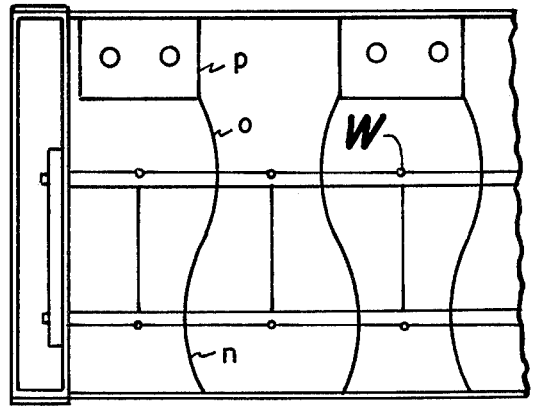

FIGS. 16 and 18 show variations in plate wall contour. As represented in FIG. 16, an inwardly concave entrance area $h$ is connected through an inwardly concave central area $i$ to a planar exit area $j$. In FIG. 18, the plate walls are represented by inwardly concave entry area $n$, by a central inwardly convex area $o$, and by a substantially planar exit area $p$. In these two embodiments, better efficiency of operation will be attained by assuring that the flow of gas or air is from the side of the device which represents bottom portions of FIGS. 16 and 18.

Figure 17:
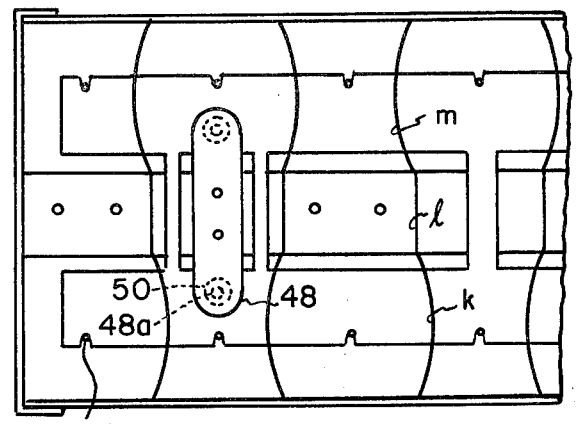
FIGS. 17 and 19 are views on the scale and similar to FIGS. 16 and 18, but illustrating different plate contoured passageways such that the units will have substantially the same operating efficiency irrespective of whether the air flow is from one side or the other side thereof.
Figure 19:
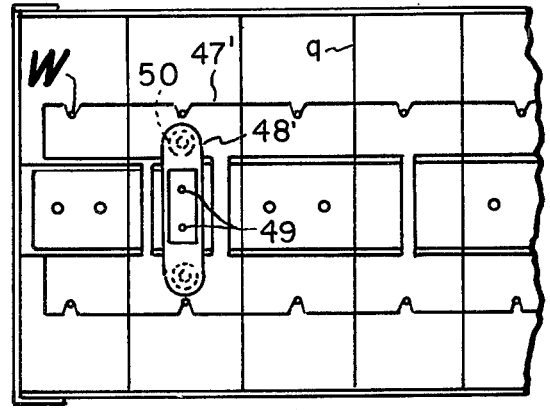

In the embodiments of FIGS. 17 and 19, the direction of flow may be from either side. In FIG. 17, it will be seen that inwardly concave sides $k$ provide convex adjacent areas and inwardly convex side walls $m$ provide concave adjacent areas. Central walls $l$ provide planar central areas. In the embodiment of FIG. 19, the sides of the plate walls $q$ are of uniform planar construction along their full through extent.

Figure 20:
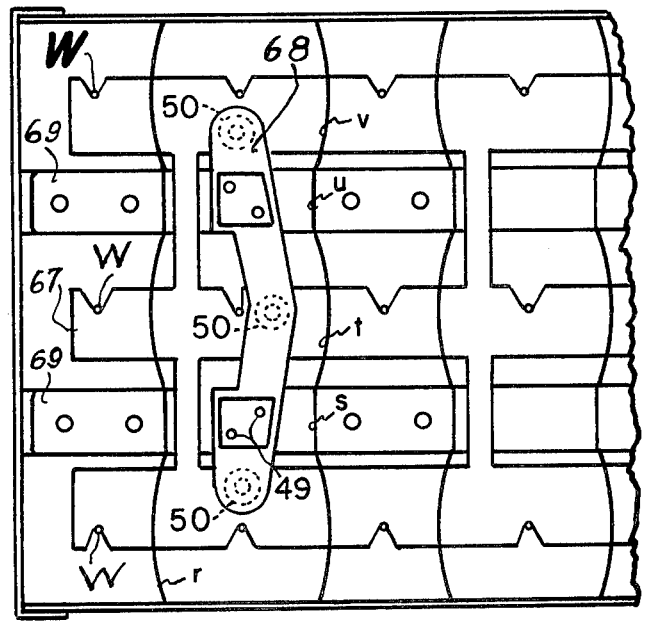
FIG. 20 is a view on the scale and similar to FIGS. 16 to 19, inclusive, particularly illustrating an arrangement in which three parallel ionizing wire rows are employed, as compared to the two rows of FIGS. 16 to 19; this view is also illustrative of different types of contouring. As in the embodiments of FIGS. 17 and 19 and also of FIGS. 4 and 9, substantially the same operating efficiencies may be attained irrespective of which side becomes the in-flow side and which side becomes the out-flow side of the apparatus.

In the previous embodiments I have shown a pair of resin stretch, supporting, spreader or mounting bars 47, 47' as having a pair of side rails for mounting two tandem wire rows W. In FIG. 20, a variation is shown in which an opposed pair of insulating or resin bars 67 is provided with three rails represented by two side and one central rail for mounting three tandem wire rows W to thus provide three sets of wire stretches 62. Compare the bars 47, 47' of the other embodiments. Also, in this embodiment, end-positioned mounting brackets 68 are of slightly modified form as compared to the brackets 48, 48', in that they are adapted to carry three compression springs 50 instead of two. Also, two adjacent metal support members 69 are mounted along the upper and lower frame areas of the operating unit E instead of one member 45, 45' along the same areas of the previously described embodiments. In this embodiment, the wall areas are represented by inwardly concave walls $r$, planar walls $s$, inwardly concave walls $t$, planar walls $u$ and inwardly concave walls $v$. As in the embodiments of FIGS. 17 and 19, this construction is suited for air introduction from either of its sides.

I claim:

1. An improved apparatus for electrically precipitating foreign particles such as dust that are present in a gaseous medium such as air which comprises, a frame defining a through-extending open central portion, a group of continuously connected longitudinally extending spaced-apart configurated electrically conductive plate portions mounted within said open portion, a continuous ionizing wire length having a pair of opposed rows of end-positioned connecting loop portions and a series of substantially parallel length portions in a spaced relation along and between adjacent pairs of said plate portions, cooperating spring means; a pair of opposed and spaced-apart bar members extending along outer reaches of said rows of connecting loop portions and means for maintaining said bars members in a self adjusting outwardly flexibly spread-apart positioned relation with respect to each other for positioning said rows in an electrically insulated self-adjustably tensioned relation along said bar members within the open central portion of said frame, means independent of said spring means for applying electric current of positive potential to said continuous wire for electrically charging foreign particles in a gaseous medium moving through said open portion, and means for applying electric current of opposite potential to said plate portions for collecting the charged particles thereon.

2. An improved apparatus as defined in claim 1 wherein said means for applying current of positive potential is adapted to engage a connecting loop portion of said wire length in its positioned relation along an associated one of said bar members.

3. An improved apparatus as defined in claim 2 wherein said means for applying current of positive potential has a tensioned arm adapted to engage the said connecting loop portion of said wire length.

4. An improved apparatus as defined in claim 1 wherein said spring means comprises flexible tension-maintaining means connecting opposite ends of said continuous wire length between said pair of bar members.

5. An improved apparatus as defined in claim 1 wherein, said means for maintaining said bar members in a flexibly spread-apart relation with respect to each other comprises a pair of opposed and spaced-apart support members carried by said frame and mounting said plate portions within said housing, and said maintaining means further comprises compression spring means positioning each bar member of said pair on an associated one of said pair of support members.

6. An improved apparatus as defined in claim 1 wherein said spring means comprises tension springs connecting each end of said continuous wire length in an adjustably tensioned relation with respect to said pair of bar members, and each bar member of said pair has rounded recess portions adjustably carrying an associated row of said loop portions of said continuous wire therealong.

7. An improved apparatus as defined in claim 1 wherein, means is carried by said bar members for guidably supporting and positioning said loop portions of said continuous wire length in such a manner as to enable tensioned adjustment of said continuous wire along the full extent of its length, said spring means is positioned with respect to said bar members and opposite end portions of said continuous wire for maintaining said length portions of said wire in a tensioned self-adjustably securely retained position along their full extent on said pair of bar members and between said plate portions, and said means for applying electric current of positive potential comprises an electrically conductive element adapted to slidably engage one of said loop portions.

8. An improved apparatus as defined in claim 1 wherein, a pair of support members are secured within said frame to extend along opposite sides of the open central portion thereof, said plate portions comprise a plate member row having opposed end tabs defining integral loop-like connecting portions, and said connecting portions are secured on said support members.

9. An improved apparatus as defined in claim 8 wherein said plate member row is of one-piece integral metal construction which extends fully along the length extent of said ionizing wire.

10. An improved apparatus as defined in claim 8 wherein, each of said bar members extends along an associated one of said support members, and said maintaining means comprises spring means for flexibly urging said bar members outwardly with respect to each other.

11. An improved apparatus as defined in claim 10 wherein each of said bar members has means positioning said loop portions of said wire in an electrically insulated and endwise adjustable relationship with respect to said support members.

12. An improved apparatus as defined in claim 10 wherein, each of said bar members has a central area therealong provided with cross-connecting portions and open by-pass portions, mounting means is carried by each of said support members and extends through said open by-pass portions, and said spring means of said maintaining means is carried by said mounting means to engage and support an associated said bar member thereon.

13. An improved apparatus as defined in claim 10 wherein, each of said bar members has a pair of said rails and a central area therebetween in alignment with and along an associated one of said support members, a pair of continuous wires of the defined construction and positioning are connected to said electric current applying means and are mounted to extend between each pair of opposed side rails of said pair of bar members.

14. An improved apparatus as defined in claim 1 wherein, each said bar member has a pair of said rails that are connected together in a spaced relation and in such a manner as to define a central series of open by-pass portions therealong, electrically conductive support members are secured to said frame and extend along said open by-pass portions of each of said bar members, said plate portions have opposed end tabs that extend through said open by-pass portions and are secured to an associated one of said support members, and said bar members are of electrical insulating material for providing the insulating of said continuous wire from said support members and said plate portions.

15. An improved apparatus as defined in claim 1 wherein, said plate portions are defined by a continuous one-piece electrically conductive metal plate member of interconnected spaced looped construction, and a pair of spaced-apart electrically conductive metal support members are secured to said frame and said plate member for mounting said plate member adjacent opposite ends thereof within said frame.

16. An improved apparatus as defined in claim 15 wherein, each of said bar members has means for carrying said loop portions of said continuous wire in an electrically insulated adjustable positioning therealong.

17. An improved apparatus as defined in claim 16 wherein, each of said support members has a centrally inwardly offset channel portion, each of said pair of bar members has a central area therealong provided with alternate cross-connecting portions and open portions, and said maintaining means comprises mounting brackets secured to extend inwardly from said offset channel portion of each of said support members through the open portions in an associated one of said bar members, and spring means extending from each of said mounting brackets into engagement with an associated one of said pair of bar members for mounting said bar members in the flexible self-adjustable spread-apart relation with respect to each other.

18. In an improved apparatus as defined in claim 17, further comprising a housing removably containing said frame therein and wherein, each of said bar members has a series of spaced-apart side guide slots therealong on which said loop portions of said continuous wire are adjustably positioned, and said means for applying electric current of positive potential to said continuous wire comprises: first contact means carried in an insulated relation within said housing, flexible contact means carried in an insulated relation by said frame and adapted to slidably engage said first contact means, and said flexible contact means being adapted to engage a loop portion of said wire length.

19. An improved apparatus as defined in claim 1 wherein, each of said bar members has a series of rounded slot portions therealong that adjustably position an associated row of said loop portions, and said spring means has means associated with each of said bar members for self-adjustably maintaining said continuous wire in a tightly tensioned extending relation along its full length between said pair of bar members.

20. An improved apparatus for electrically precipitating foreign particles such as dust that are present in a gaseous medium such as air which comprises, a frame defining a through-extending open portion, an electrically conductive collector plate having a group longitudinally extending spaced-apart configurated electrically conductive plate portions mounted within the open portion, a continuous one-piece ionizing wire length mounted in a spaced relation lengthwise along and between adjacent pairs of said plate portions, bar members extending along outer reaches of said wire length, force generating means and means for maintaining said bar members in a self adjusting outwardly flexibly spread-apart positioned relation with respect to each other force generating means for maintaining said wire length in a self-adjusting tensioned relations fully therealong within said open portion, means independent of said force generating means for applying electric current of positive potential to said wire length for electrically charging foreign particles in a gaseous medium moving through said open portion, and means for applying electric current of opposite potential to the said collector plate for collecting the charged particles thereon.

21. An improved apparatus as defined in claim 20 wherein said wire length is in the form of spaced-apart loop connected lengths positioned along and between said plate portions, and said means for applying electric current of positive potential engages said wire length intermediate its end portions.

22. In an improved apparatus for electrically precipitating foreign particles such as dust that are present in a gaseous medium such as air which comprises, a unitary frame construction, said frame having a pair of electrically conductive cross-extending support members secured in a longitudinally spaced-apart relation with respect to each other, an electrically conductive plate member assembly having a row of transversely spaced-apart and longitudinally extending configurated length portions defining operating compartments therebetween and having opposed loop-like connecting end portions secured between said pair of support members, a pair of electrically non-conductive spaced-apart cross-extending spreader bar members each of which is carried in an outwardly urged mounted relation on and with respect to an associated one of said support members, a pair of continuously integral ionizing wire lengths, each having a pair of opposed rows of end-positioned connecting loop portions carried in an electrically insulated self-adjustably tensioned relation along opposite sides of and on and between said pair of bar members and having a series of looped mounting portions and a series of substantially parallel spaced-apart length portions in a spaced relation along the operating compartments between the length portions of said plate member assembly, and electrical connections to said plate member assembly for supplying negative electric current thereto and to one of said looped mounting portions of said pair of continuous wire lengths for supplying positive electric current thereto.

23. An improved apparatus as defined in claim 22 wherein compression spring means flexibly mounts said pair of bar members in a self-adjustably spread relation with respect to each other and on said pair of support members, and tension spring means self-adjustably mounts opposite ends of each of said continuous wire lengths on and between said pair of bar members.

24. An improved apparatus for electrically precipitating foreign particles such as dust that are present in a gaseous medium such as air which comprises, a housing having a bounding frame defining a through-extending open side area and an end-positioned entry portion, and an operating unit adapted to be slid into and out of a centrally disposed position within said central area through said entry portion; said operating unit comprising, a pair of spaced-apart electrically conductive cross-extending support members, an electrically conductive plate member assembly having spaced-apart endwise-connected longitudinally extending configurated length portions defining operating compartments therebetween and secured at opposite ends thereof between said pair of support members, a pair of spaced-apart cross-extending spreader bar members each of which is carried by an associated one of said support members, a continuous ionizing wire length having an integral construction and provided with a pair of opposed rows of end-positioned connecting loop portions carried in an electrically insulated flexibly adjustably tensioned relation on and between said pair of bar members and having a series of substantially parallel spaced-apart length portions in a spaced relation along the operating compartments between the length portions of said plate member assembly, an electrical contact carried by one of said bar members in engagement with a looped portion of said continuous wire length; and electric current applying means carried by said housing and adapted to be engaged by at least one of said electrically conductive support members and by said electrical contact for supplying current of opposite potential between said plate member assembly and said continuous wire length when said operating unit is slid into position within said housing through said end-positioned entry portion.

25. An improved apparatus as defined in claim 24 wherein, each of said spreader bar members has at least a pair of transversely spaced-apart rail portions extending therealong, said first-mentioned continuous ionizing wire has its end-positioned loop portions mounted in an adjustable relation along one rail of each of said pair of opposed spreader bar members, a second continuous ionizing wire of the same defined construction and positioning as said first-mentioned wire has its end-positioned loop portions mounted in an adjustable relation along the other rail of each of said pair of opposed spreader bar members, and an electric contact is carried by one of said bar members in engagement with a looped portion of said second-mentioned wire length for applying positive electric current thereto.

26. An improved apparatus as defined in claim 24 wherein said plate member assembly comprises a continuous one-piece metal plate member of endwise-positioned opposed rows of interconnected spacer tab portions that are secured between said pair of support members.

27. An improved apparatus as defined in claim 24 wherein said electric current applying means comprises, a flexible spring-like slide-on means adapted to engage said electrical contact for supplying current of positive potential to said continuous wire, and an electrical slide means adapted to supply negative current to at least one of said electrically conductive support members and then to said group of plate portions.

* * * * *

UNITED STATES PATENT OFFICE
CERTIFICATE OF CORRECTION

PATENT NO. : 4,022,594

DATED : May 10, 1977

INVENTOR(S) : Edward L. Baysek

It is certified that error appears in the above-identified patent and that said Letters Patent are hereby corrected as shown below:

Column 5, line 67, delete "xtending" and substitute --extending--.

Column 6, line 58, delete "62O" and substitute --62a--.

Column 6, line 65, delete "eadh" and substitute --each--.

Column 8, line 32, delete "pecipitation" and substitute --precipitation--.

Claim 20, line 52, after "group" insert --of--.

Claim 20, line 62, after "other" insert a comma.

Signed and Sealed this twenty-sixth Day of July 1977

[SEAL]

Attest:

RUTH C. MASON
Attesting Officer

C. MARSHALL DANN
Commissioner of Patents and Trademarks